United States Patent [19]

Kolb et al.

[11] 3,911,482

[45] Oct. 7, 1975

[54] DUAL MEDIA TRANSCRIBING APPARATUS

[75] Inventors: Alfred E. Kolb, Dielsdorf; Willy Nyffenegger, Unterehrendingen, both of Switzerland

[73] Assignee: Dictaphone Corporation, Rye, N.Y.

[22] Filed: Mar. 12, 1974

[21] Appl. No.: 450,402

[52] U.S. Cl. .......... 360/15; 179/100.1 DR

[51] Int. Cl.[2] .......... G11B 5/86; G11B 27/02

[58] Field of Search .......... 360/15, 71, 13, 73, 74, 360/72; 179/100.1 DR, 100.1 PS, 100.1 R; 226/46–48, 110; 179/6 E

[56] References Cited

UNITED STATES PATENTS

| | | | |
|---|---|---|---|
| 2,396,409 | 3/1946 | Berzer | 179/100.1 PS |
| 3,360,613 | 12/1967 | Cooper | 360/13 |
| 3,484,955 | 12/1969 | Lippert | 360/74 |
| 3,527,891 | 9/1970 | Johnson | 179/100.1 DR |
| 3,662,121 | 5/1972 | Cruger | 360/74 |
| 3,758,726 | 9/1973 | Bolick, Jr. et al. | 179/100.1 R |

*Primary Examiner*—Alfred H. Eddleman
*Attorney, Agent, or Firm*—Curtis, Morris & Safford

[57] ABSTRACT

Dual media transcribing apparatus for use with a central record/reproduce device having an endless magnetic tape upon which signals have been recorded and with a magnetic reproducing device having a magnetic tape cassette upon which signals have been recorded is disclosed. The dual media transcribing apparatus is selectively operable to control the central record/reproduce device and the magnetic reproducing device for reproducing the pre-recorded signals therefrom. Operator actuable switches are provided for selectively controlling the operation of the central record-/reproduce device and the magnetic reproducing device. An audio signal processor receives the audio signals reproduced by the central record/reproduce device and the magnetic reproducing device in accordance with the actuation of the switches. A transducer coupled to the signal processor generates audible signals corresponding to the reproduced audio signals.

15 Claims, 2 Drawing Figures

DUAL MEDIA TRANSCRIBING APPARATUS

BACKGROUND OF THE INVENTION

This invention relates to a dual media transcribing apparatus and, more particularly, to such apparatus that is adapted for use with an endless magnetic tape central record/reproduce device and a magnetic tape cassette reproducing device to selectively control the operation of the respective devices to thereby permit the audible reproduction of signals that have been previously recorded by the respective devices.

A dictating system employing an endless loop of magnetic tape in a central record/reproduce device that has met with success is described in U.S. Application Pat. No. 319,928 filed on Dec. 26, 1972, now abandoned, in U.S. Application Ser. No. 322,373 filed Jan. 10, 1973, now U.S. Pat. No. 3,823,214, and in U.S. Application Ser. No. 322,530 filed Jan. 10, 1973, now U.S. Pat. No. 3,835,261. As therein described, the central record/reproduce device is compatible with a plurality of remote dictating stations any one of which is adapted to seize and communicate with the central device. Dictated information is recorded on the endless magnetic tape loop provided at the central record/reproduce device, which device is operable to permit the review and edification of dictated material during a dictate operation.

The endless loop of magnetic tape that is employed at the central record/reproduce device is stored in a manner to permit significant quantities of tape to accumulate. In particular, a signal recording head is provided to enable the recording of audio information signals on the magnetic tape. Additionally, a signal reproducing head is provided to permit the reproduction of pre-recorded signals from the magnetic tape. Tape storage permits a quantity of tape bearing pre-recorded signals to accumulate upstream of the signal reproducing head to thus expedite a signal transcribing operation by, for example, a typist, In a similar manner, a quantity of tape adapted for the recording of dictated information thereon is permitted to accumulate upstream of the signal recording head to thus expedite a dictate operation.

When operating this central record/reproduce device in a transcribe mode, an operator is provided with suitable switching devices to advance the tape beneath the signal reproducing head and, when required, to rewind or backspace the tape beneath this head. The accumulation of a quantity of tape upstream of the signal reproducing head readily permits the advance and backspacing of such prerecorded tape. Typically, the necessary switching devices to control the operation of the central record/reproduce device are provided in a conventional foot actuated switch. Also, a signal transducer is provided to receive the reproduced audio signals from the reproducing head and to generate audible sounds therefrom corresponding to the previously dictated information. As is appreciated, a skilled operator may easily operate the foot acutated switch to thus detect and transcribe the previously dictated information.

Various other magnetic dictating devices are now available to permit the magnetic recording of dictated information onto a suitable magnetic medium. One such device employs a magnetic tape cassette or cartridge wherein magnetic tape is stored within a suitable housing. The magnetic tape is completely contained within such housing and is generally moved in reel-to-reel fashion for the recording, review and reproduction of information. In general, the cassette-type dictating system is operable with only a single dictating station. Such dictating station is usually integral with the cassette-type record/reproduce device. In many instances, a pre-recorded tape cassette must be transferred from a dictating device to a transcribing device to permit the transcription thereof by, for example, a typist. Nevertheless, such cassette-type dictating systems have become commercially popular because of the intrinsic portability thereof. Also, such systems are not overly complex to operate; and a suitable supply of magnetic tape cassettes is not economically prohibitive.

It is apparent that there are many instances where one who enjoys the use of an endless magnetic tape central record/reproduce dictating system of the type described above might also use a magnetic tape cassette dictating system. In these instances, information recorded on the magnetic tape cassette generally cannot be directly transcribed by the central record/reproduce device. It has heretofore been necessary to re-record the information previously recorded on the magnetic tape cassette onto the endless magnetic tape. To perform this operation, a system has been proposed of the type described in U.S. Ser. No. 327,643 filed Jan. 29, 1973, now U.S. Pat. No. 3,839,600. As disclosed therein, the audio signals pre-recorded on one magnetic medium are reproduced and then re-recorded on the endless loop of magnetic tape. Such magnetic recording medium may comprise a magnetic tape cassette.

Unfortunately, in that proposed system an operator must await the complete re-recording of information before a transcribing operation may be commenced. This is often time consuming and may prohibit the useful operation of the respective devices during the information re-recording interval.

OBJECTS OF THE INVENTION

Therefore, it is an object of the present invention to provide dual media transcribing apparatus for reproducing signals that have been pre-recorded on an endless loop of magnetic tape or on a magnetic tape cassette.

It is another object of the present invention to provide dual media transcribing apparatus that permits the selective control of a central record/reproduce device and a magnetic tape cassette reproducing device by an operator.

A still further object of the present invention is to provide a simple dual media transcribing apparatus for use with a central record/reproduce device and a magnetic tape cassette reproducing device whereby information dictated onto an endless loop of magnetic tape or a magnetic tape cassette may be directly reproduced and transcribed.

Various other objects and advantages of the invention will become clear from the forthcoming detailed description of an exemplary embodiment thereof and the novel features will be particularly pointed out in connection with the appended claims.

SUMMARY OF THE INVENTION

In accordance with this invention, dual media transcribing apparatus is provided for use with a central record/reproduce device having an endless magnetic tape upon which audio signals have been recorded and with a magnetic reproducing device having a magnetic tape cassette upon which audio signals have been recorded; the dual media transcribing apparatus is selectively operable to control the central record/reproduce device and the magnetic reproducing device for reproducing the pre-recorded signals; operator actuable switches permit the selective control of the central record/reproduce device and the magnetic reproducing device whereby bidirectional movement of the magnetic tape therein is regulated; audio signals selectively reproduced by the central record/reproduce device and the magnetic reproducing device are converted into audible sounds by the dual media transcribing apparatus.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION OF AN EXEMPLARY EMBODIMENT

Figure 1:
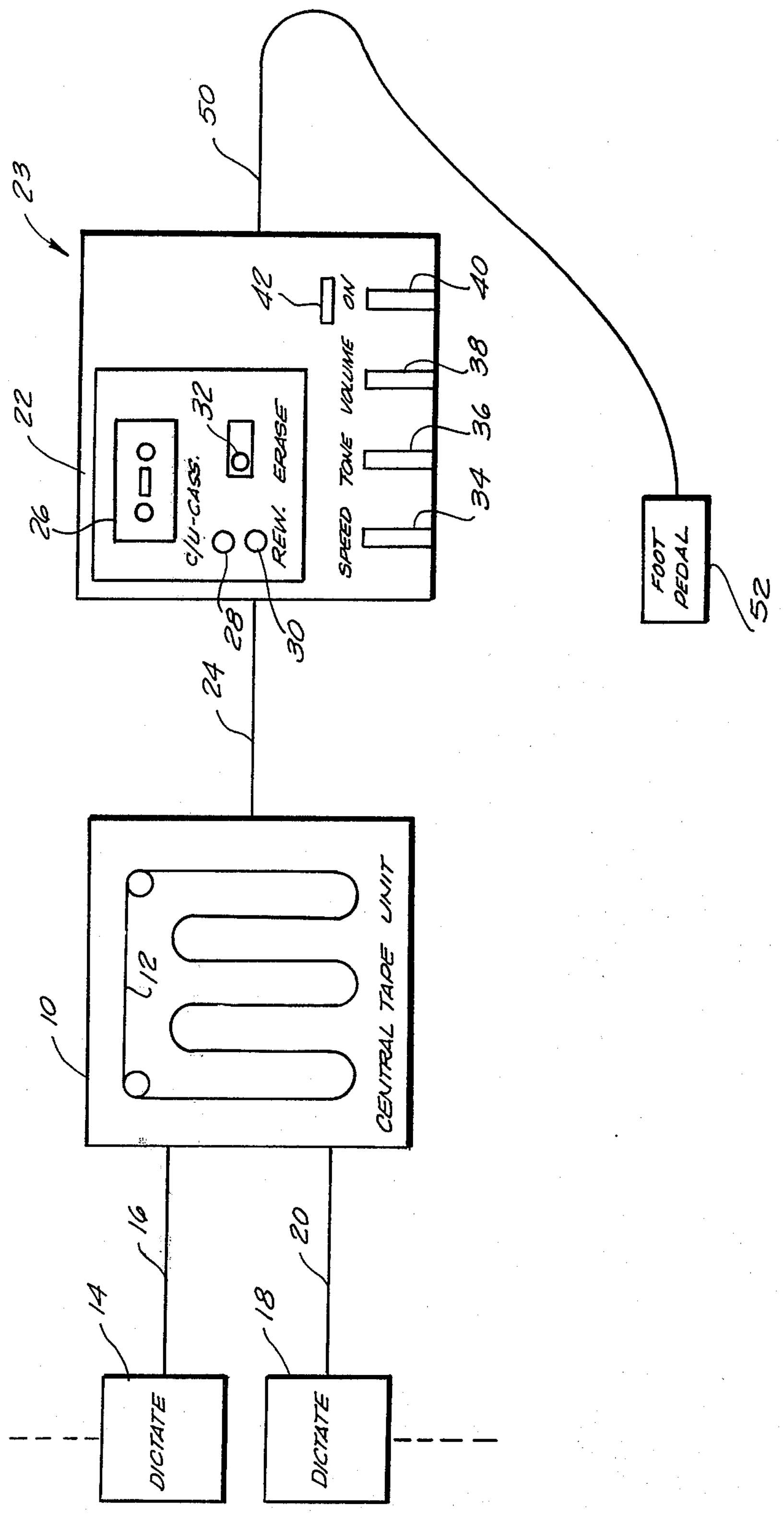
FIG. 1 is a block diagram of the dual media transcribing apparatus of the present invention.

Referring now to the drawings, wherein like reference numerals are used throughout, and in particular to FIG. 1, there is illustrated a block diagram of a dictating system wherein the dual media transcribing apparatus of the present invention finds ready application. The dictating system includes a central record/reproduce system of the type described in the aforenoted U.S. Pat. applications and comprised of a central unit 10 and a plurality of remote stations, two of which are identified as dictate stations 14 and 18. Additionally, a magnetic tape cassette reproducing device 22 is provided to permit the reproduction of signals previously recorded on a magnetic tape cassette.

The central record/reproduce device 10 includes an endless loop of magnetic tape 12, portions of which may be accumulated within the central unit. Although not shown herein, it is appreciated that the central unit 10 is provided with a signal recording head, a signal reproducing head, an erase head and suitable tape drive and control circuitry to advance and reverse the tape. As described in greater detail in the aforenoted patent applications, a quantity of tape 12 may be accumulated upstream of the signal recording head to permit unused tape to be bidirectionally moved beneath the recording head. For dictating information onto the tape 12, the central unit 10 is electrically connected to a remote dictate station 14 by a cable 16. Generally, the cable 16 comprises a multi-conductor cable such that the activation of suitable controlling mechanisms at the dictate station 14 transmits corresponding control signals to the central unit 10 via the cable 16 to advance the tape 12, to reverse the tape, to supply signals for recording and to return reproduced signals so that an operator may dictate information and review previously recorded information. In a similar manner, the remote dictate station 18 is coupled to the central unit 10 by a cable 20. Suitable circuitry is provided at the respective dictate stations and at the central unit 10 to allow only a single dictate station to seize the central unit and to assure the privacy of communication with the central unit by that one dictate station.

The central unit 10 is additionally provided with suitable drive control circuitry and mechanisms to operate with the signal reproducing head so that an operator may advance previously dictated tape beneath the signal reproducing head and to backup tape beneath that head to facilitate a transcribing operation. Typically, a foot actuated switching mechanism is operated to energize the appropriate drive circuitry and drive mechanisms so that the tape may be moved in a forward and reverse direction. Also, audio signal amplifiers and filtering circuits may be connected to the signal reproducing head to appropriately amplify the reproduced audio signals. Such amplified signals are supplied to a conventional sound transducer whereby audible intelligence is produced. Hence, an operator may readily use the foot actuated switch and sound transducer to perform a signal transcribing operation.

The magnetic tape cassette reproducing device 22 may comprise a record/reproduce device to enable the dictation of information onto a magnetic tape cassette and, additionally, the reproduction of pre-recorded information. For the purpose of the present invention, only the reproducing mode is of interest and, therefore, it will be assumed that the device 22 comprise a magnetic reproducing device. The magnetic reproducing device 22 is adapted to receive a magnetic tape cassette 26 of the type comprised of a housing within which magnetic tape is stored. Typically, the magnetic tape cassette 26 admits of reel-to-reel operation in a forward and reverse direction. Alternatively, the cassette 26 may comprise a cartridge within which a single reel of endless tape is provided.

The magnetic reproducing device 22 is provided with suitable tape drive circuitry and mechanisms to control the movement of the magnetic tape stored within the cassette 26. Typically, such drive circuitry and mechanisms permit the forward movement of the tape at first and second speeds (e.g. a forward or "play" speed and a fast forward speed) and the reverse or rewind movement of the tape. A tape speed adjusting circuit might also be included within the magnetic reproducing device 22 to allow for varying recording speeds characteristic of the dictating apparatus that might be used to record signals on the magnetic tape cassette. The tape drive circuitry and mechanisms are generally responsive to operator initiated action, such as the energization of various switches. For example, the magnetic reproducing device 22 might be compatible with foot actuated switches that control the forward, fast forward and rewind movement of the tape. Also, a signal reproducing head is provided in cooperation with suitable amplifying circuitry for the reproduction of pre-recorded audio signals. The amplified signals are adapted to be converted to sound intelligence whereby an operator may transcribe the previously dictated information.

Turning now to the present invention, a dual media transcribing apparatus is provided to control the operation of the central unit 10 and the magnetic tape cassette reproducing device 22 for reproducing audio signals that have previously been recorded on the endless loop of magnetic tape 12 or the magnetic tape cassette 26. For the purpose of the present invention, the magnetic reproducing device 22 and the dual media transcribing apparatus 23 share a common housing. However, it should be readily apparent that the reproducing device and the transcribing apparatus may be disposed in separate and distinct structures. However, the generally compact design of typical magnetic tape cassette reproducing devices and the relatively simple and compact design of the dual media transcribing apparatus may be advantageously exploited so as to be provided in a single structure with an attendant minimizing of bulk and expense. A further advantageous utilization of space is achieved thereby.

The dual media transcribing apparatus 23 is electrically connected to the central record/reproduce device 10 by a cable 24. As will be described hereinbelow, with respect to FIG. 2, the cable 24 may comprise a multi-conductor cable. The dual media transcribing apparatus 23 is also electrically connected to the magnetic reproducing device 22 by suitable conductors as will be described below. As illustrated, various control devices are provided for the expeditious performance of a transcribing operation. A selecting switch 28, which may comprise a conventional push button switch, is provided to allow an operator to select either the central unit 10 or the cassette unit 22 for operation. Typically, the push button switch 28 admits of two operable conditions. In a first condition the central record/reproducing device 10 is selected for operation. In a second condition, the magnetic reproducing device 22 is selected for operation.

A rewind switch 30, which may also comprise a push button switch, is adapted, when actuated, to rewind the magnetic tape stored in the cassette housing 26. That is, actuation of the switch 30 results in the motion of the magnetic tape within cassette 26 in a generally reversed sense. It is recognized that if, during a signal reproducing mode of operation, the magnetic tape is translated from its supply reel to its takeup reel within the cassette 26, the actuation of the switch 30 reverses the movement of the tape so that tape is played out from the take-up reel to the supply reel. Preferably, the reverse movement of the tape is accomplished at a much higher speed than the forward movement thereof during a signal reproducing operation. However, this feature of rapid rewind is not necessary to the successful practice of the present invention.

An erase switch 32 is provided to allow the erasure of previously recorded signals from the magnetic tape housed within cassette 26. Operation of the switch 32 is effective to move a conventional erase head into operable relation with the magnetic tape housed within the cassette 26. Previously recorded signals will be erased from the magnetic tape when the tape is moved past the erase head in either the forward or reverse direction. The precise nature of the magnetic erase head and the control switch 32 therefor form no part of the present invention and further description thereof is not provided.

As aforenoted, it is preferable to provide a single structure for the magnetic reproducing device 22 and the dual media transcribing apparatus 23. Accordingly, the tape speed varying capabilities of the magnetic reproducing device 22 may be utilized by providing the speed control member 34. Typically, speed control is attained by varying the operating speed of the capstan and tape drive motor. A variable parameter included in the motor control circuitry of the magnetic reproducing device 22 may, therefore, be mechanically coupled to the speed adjust member 34. As will be shown hereinbelow, such variable parameter may typically comprise an adjustable resistor such as a potentiometer, a rheostat or the like. The member 34 may thus be mechanically coupled to the movable contact or slider of such variable resistor. Generally, the speed at which the endless magnetic tape 12 included in the central record/reproduce device 10 moves should not be altered. Accordingly, the speed control member 34 is preferable not coupled to the central unit 10. The manual adjustment of the member 34 will, therefore, effect a variation in the speed of the tape in the cassette 26 only.

As will be described in detail hereinbelow, the dual media transcribing apparatus 23 includes signal processing circuitry, such as amplifiers, filters and the like, for the proper amplification and filtering of reproduced audio signals. It is desirable to provide the capability of allowing an operator to adjust the various characteristics of the audible sounds generated in response to the amplified audio signals. Accordingly, a sound tone control member 36 and a volume control member 38 are provided. Adjustment of these respective members is adapted to vary the tone characteristics and volume of the audible sounds, as desired. The respective tone and volume adjust members may, therefore, comprise suitable dials that are mechanically coupled to adjustable impedance elements included in the signal processing circuitry. As an example, the adjustable impedance elements may comprise variable resistors, such as potentiometers, rheostats or the like, whereby adjustment of the tone and volume adjust members effects a corresponding adjustment in the variable resistors with the resultant modifications in the tone and volume of the audible sounds.

Foot actuated switches, conveniently provided in a foot pedal device 52, are electrically connected to the push button switch 28 by cable 50. The cable may comprise a multi-conductor cable. The switches included in the foot pedal device 52 comprise a fast forward switch, a forward switch and a rewind switch, the respective operation thereof resulting in the corresponding movement of the endless magnetic tape 12 or the magnetic tape included within the cassette 26, as determined by the push button switch 28. For example, if the push button switch 28 is operated so as to select the central record/reproduce device 10, the appropriate operation of the foot pedal device 52 is adapted to control the movement of the endless tape 12. It is recalled that the endless tape 12 does not admit of a fast forward movement capability. Accordingly, and as will be described in detail below, the actuation of the foot pedal device 52 to select a fast forward movement of tape will have no effect upon the tape 12.

In the exemplary embodiment described herein, the foot pedal device 52 is adapted to control three distinct categories of tape movement. Accordingly, three distinct switches may be provided within the foot pedal device and various foot actuated mechanical mechanisms are cooperable therewith. As one example, the foot actuated mechanism of the foot pedal comprises three individual pedals associated with the three respective switches. In another example, the foot actuated mechanism comprises two individual pedals. Operation of the first pedal, as by depressing the pedal, activates the rewind switch. The other pedal is associated with the forward and the fast forward switches and admits of two operable conditions. Thus, when this pedal is depressed by a first predetermined amount, the forward switch is operated. Further depression of this pedal causes the fast forward switch to be operated. In a third example, the foot actuated mechanism comprises a single rockable pedal adapted for rocking movement about an axis. The operation of the rockable pedal is seen to be very similar to the aforedescribed example comprised of two pedals.

The dual media transcribing apparatus 23 is further provided with an on/off switch 40 adapted to supply power to the transcribing apparatus and, additionally, a visual indicator 42 to indicate when power is supplied. The visual indicator may comprise a conventional lamp, such as an incandescent lamp, a neon lamp, or the like, or a light emitting diode or light emitting transistor.

The manner in which the dual media transcribing apparatus 23 is operated to control the central record/reproduce device 10 and the magnetic reproducing device 23 will now be briefly described. It is appreciated that the dictated information recorded on the endless loop of magnetic tape 12 is derived from the operation of the remote dictate station, as fully described in the above mentioned applications. Also, the dictated information recorded on the magnetic tape housed within the cassette 26 is obtained from a dictate operation that has employed a cassette-type dictating device. If the magnetic reproducing device 22 admits of the capability of magnetic recording, such recorded information may be obtained by the prior use of the device 22 as a dictate station. Alternatively, a separate cassette-type dictating device may be used to record the dictated information and the pre-recorded magnetic tape cassette may then be suitably disposed in the magnetic reproducing device 22.

If an operator wishes to use the transcribing apparatus 23 to reproduce the pre-recorded information provided at the central record/reproduce device, the push button switch 28 is appropriately operated to thereby select the central device 10 which is to be controlled. It is here assumed that the push button switch admits of two operable conditions and is disposed in its first operable condition. Accordingly, operation of the foot pedal device 52 activates the appropriate tape drive circuitry and mechanisms in the central record/reproduce device to enable a transcribing operation. The characteristics of the audible sounds generated in accordance with the reproduced audio signals may be varied by the operator, as desired, in accordance with the appropriate operation of the tone and volume adjust controls 36 and 38, respectively. Thus, a forward movement of the endless loop of magnetic tape 12 past the signal reproducing head included in the central record/reproduce device 10 is obtained by operating the foot pedal device 52 to thereby activate the forward control switch included therein. Also, the movement of the tape 12 may be reversed to permit a subsequent review of pre-recorded information by operating the foot pedal device 52 such that the rewind control switch is activated. It is recalled that, preferably, the central record/reproduce device 10 does not admit of the capability of rapidly advancing the endless loop of magnetic tape 12. Accordingly, the operation of the foot pedal device 52 to activate the fast forward switch therein has no effect upon the central unit 10.

If an operator wishes to recover the signals prerecorded on the magnetic tape cassette 26, the push button switch 28 is appropriately operated. The magnetic reproducing device 22 may be selected to be controlled by disposing the push button switch 28 in its second operable condition. In this regard, the push button switch is conventional in that the first and second operable conditions thereof are mutually exclusive. It is appreciated that, when the magnetic reproducing device 22 is selected, the appropriate operation of the foot pedal device 52 by an operator causes the corresponding movement of the tape housed within the cassette 26. Accordingly, when the forward switch within the foot pedal device 52 is activated, the magnetic tape is advanced so as to be played out from the supply reel to the take-up reel within the cassette 26. As the prerecorded tape is advanced past the reproducing head of the magnetic reproducing device 22, the pre-recorded signals are recovered and supplied to the signal processing circuitry included within the apparatus 23. Audible sounds are generated from the reproduced signals whereby the previously dictated information is recovered. Appropriate adjustment of the tone and volume control members 36 and 38 permits an operator to vary the auditory characteristics of the generated sounds as desired.

If the foot pedal device 52 is operated so as to activate the fast forward switch therein, the magnetic reproducing device 22 operates to rapidly advance the tape within the cassette 26. Of course, release of the switches within the foot pedal device 52 causes the tape movement to be arrested.

The motion of the tape within the cassette 26 may be reversed by operating the foot pedal device 52 so as to activate the rewind switch therein. The reversal in the movement of the tape permits an operator to further review those sections of the tape that had been advanced past the signal reproducing head. Of course, if the activation of the rewind switch within the foot pedal device 52 is maintained, the entire tape may be rewound from the take-up reel onto the supply reel. This rewind operation may, alternatively, be performed by the operation of the push button switch 30. If desired, the signals which had been recorded on that portion of the tape that is being rewound in response to the activation of the push button switch 30 are to be erased, the erase switch 32 may be operated. When the push button switch 30 is released, the reverse movement of the tape within cassette 26 is arrested. In one embodiment a mechanical interlock is provided between the push button switch 30 and the erase switch 32 such that the erase switch is effectively locked in its operable condition while the push button switch 30 is depressed. Hence, the release of the push button switch 30 results in the de-activation of the erase switch 32. It may be appreciated that the push button switch 30 and the erase switch 32 are operably connected only to the magnetic reproducing device 22. Hence, the operation of these switches when the push button switch 28 is disposed in its first operable condition whereby the central record/reproduce device 10 is selected has no effect on the central unit or the endless loop of magnetic tape 12 therewithin.

Figure 2:
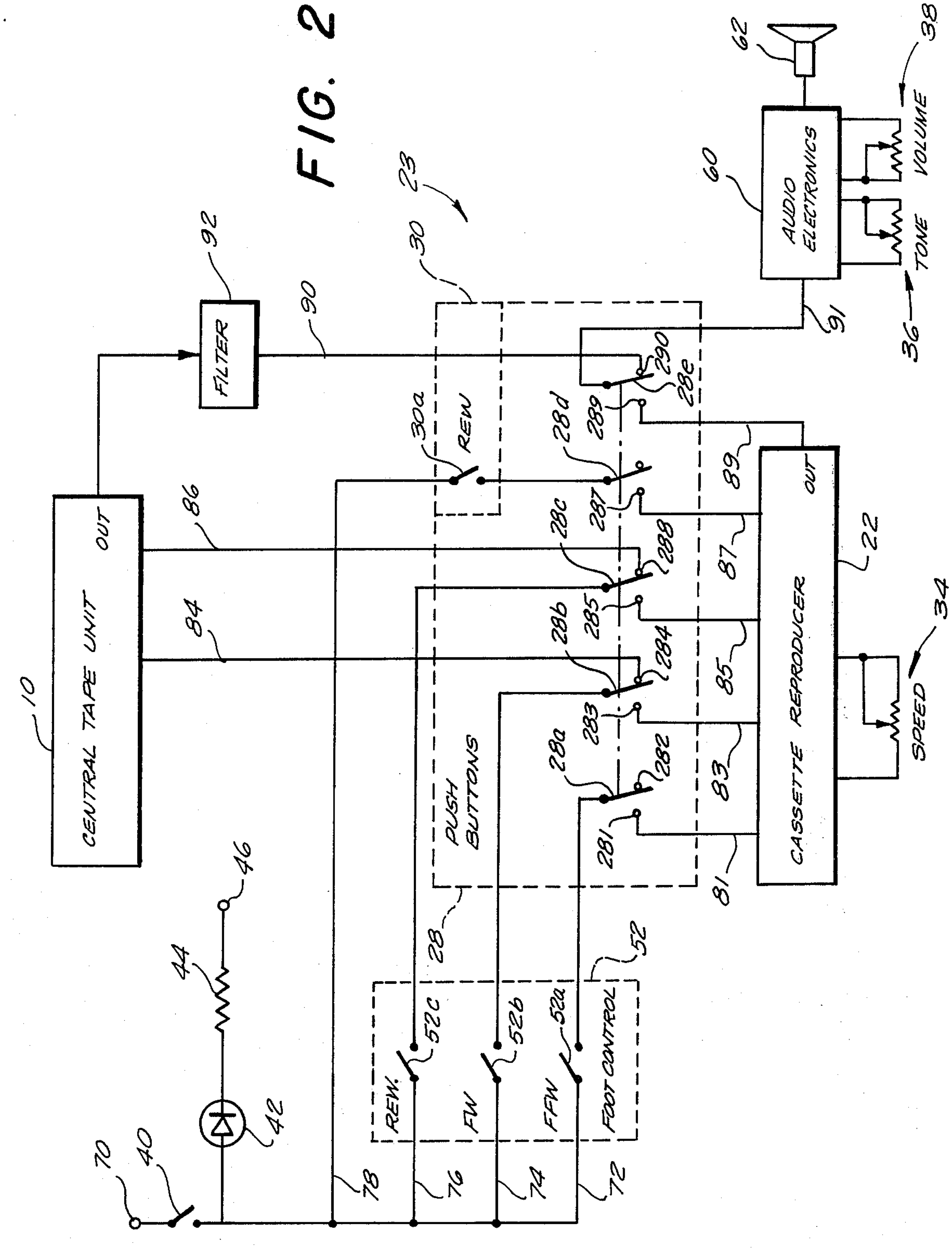
FIG. 2 is a partial schematic diagram of portions of the dual media transcribing apparatus of the present invention.

A more detailed illustration of the dual media transcribing apparatus 23 and the interconnection thereof with the central record/reproduce device 10 and the magnetic reproducing device 22 is shown in partial schematic and partial block form in FIG. 2. To facilitate the description of the present invention as depicted in FIG. 2, the magnetic reproducing device 22 is shown as a mere block that is electrically connected to the transcribing apparatus 23. Nevertheless, it should be appreciated that the reproducing device 22 may be housed in the same structure as that of the transcribing apparatus or, alternatively, individual housings therefor, may be provided.

The push button switch 28 comprises a multi-layer push button switch, each layer including a movable contact and at least two stationary contacts. The foot pedal device 52 is seen to comprise the aforementioned three control switches, viz., fast forward, forward and rewind switches. As is apparent, the number of layers included in the multilayer push button switch 28 is at least equal to the number of switches included in the foot pedal device 52 and, in the illustrated configuration, the multi-layer push button switch is comprised of five simultaneously operated switches. In particular, a first-layer switch including a movable contact 28*a* and stationary contacts 281 and 282 is electrically connected to the fast forward switch 52*a*. The stationary contact 281 is coupled via conductor 81 to the magnetic reproducing device 22. Hence, when a suitable energizing signal is applied to the conductor 81 the appropriate tape drive circuitry included within the magnetic reproducing device 22 is adapted to drive the tape therein in the forward direction at a relatively fast speed. It is seen that the stationary contact 282 is electrically isolated and, in particular, is not connected to the central record/reproduce device 10. Such connection is, of course, unnecessary because the central unit 10 is not provided with the capability of a fast forward tape movement. Thus, a suitable energizing signal applied to the central unit by the stationary contact 282 would have no effect thereat. A conductor extending between the stationary contact 282 and the central unit is thus superfluous.

A second-layer switch is provided with the movable contact 28*b* electrically connected to the forward switch 52*b* and first stationary contact 283 and second stationary contact 284. The contact 283 is coupled via conductor 83 to the magnetic reproducing device 22. Similarly, the contact 284 is coupled via conductor 84 to the central record/reproduce device 10. It may be appreciated that the selective application of a suitable energizing signal to either contact 283 or contact 284 results in the appropriate energization of the tape drive circuitry provided at the magnetic reproducing device 22 and the central record/reproduce device 10, respectively. The respective devices are adapted to respond to this energizing signal to advance the tape within cassette 26 of the endless loop of magnetic tape 12, respectively, in a forward direction.

A third-layer switch is comprised of a movable contact 28*c* electrically connected to the rewind swtich 52*c* and first stationary contact 285 and second stationary contact 286. The contact 285 is connected to the magnetic reproducing device 22 by conductor 85 and the contact 286 is connected to the central record/reproduce device 10 by conductor 86. The selective application of an energizing signal to the contacts 285 and 286 results in the corresponding energization of the tape drive circuitry provided at the devices 22 and 10, respectively. The respective devices are adapted to respond to such energizing signal to drive their respective tapes in the reverse direction. It may be appreciated that the conductors 84 and 86 are included in the multi-conductor cable 24 of FIG. 1.

A fourth-layer switch is comprised of movable contact 28*d* and stationary contacts 287 and 288. The movable contact 28*d* is electrically connected to the push button switch 30 previously described with respect to FIG. 1. It is recalled that the operation of the push button rewind switch 30 is to reverse the movement of the tape within the cassette and to thereby enable a tape rewind operation. It is further recalled that the operation of the push button rewind switch 30 has no effect upon the operation of the central record/reproduce device 10 or the magnetic tape 12 therein. Accordingly, the stationary contact 287 of the fourth-layer switch is connected via conductor 87 to the magnetic reproducing device 22 but the stationary contact 288 is electrially isolated. Thus, the application of a suitable energizing signal to the stationary contact 287 results in the energization of the tape drive circuitry at the magnetic reproducing device 22 to cause a tape rewind operation. As the results achieved by supplying an energizing signal to the magnetic reproducing device 22 via conductors 85 and 87 are similar, it is appreciated that these conductors may be connected in common at the device 22. Alternatively, conductors 85 and 87 may be connected in common within the dual media transcribing apparatus 23 and only a single conductor may then be extended from the common connection to the magnetic reproducing device 22.

A fifth-layer switch is comprised of a movable contact 28*e* and a first stationary contact 289 and a second stationary contact 290. The stationary contact 289 is connected to the magnetic reproducing device 22 via conductor 89 and the stationary contact 290 is connected to the central record/reproduce device 10 via conductor 90. In particular, these stationary contacts are connected to the audio signal output terminals of the respective devices 22 and 10 so as to be supplied with audio signals derived from the respective signal reproduce heads at the devices. Various signal amplifiers and filters may be provided between the respective signal reproduce heads of the reproducing devices and the stationary contact 289 and 290, respectively. As illustrated, a signal filter circuit 92 is coupled to the central record/reproduce device 10 to provide an additional filtering of the reproduced audio signals prior to the application of these signals to the stationary contact 290. The movable contact 28*e* of the fifth-layer switch is coupled via conductor 91 to audio signal processing electronics 60. The signal processing electronics comprises an audio signal amplifier and an audio signal filter adapted to perform the usual amplifying and filtering operations. A conventional signal transducer 62, such as a loud speaker, is coupled to the signal processing electronics 60 to generate audible sounds in response to the processed audio signals applied thereto. Additionally, a tone adjust impedance 36 and a volume adjust impedance 38, here shown as variable resistances, are coupled to the signal processing electronics 60 to attain the aforementioned tone and volume adjustments, as desired. As the precise amplifying circuitry and filtering circuitry included in the signal processing electronics are well known to those of ordinary skill in the art, and the manner in which the auditory characteristics of the generated sounds may be varied by adjusting the tone and volume impedances forms no part of the present invention, further description of the signal processing electronics 60 is unnecessary.

The respective control switches 52*a*, 52*b* and 52*c* are connected by conductors 72, 74 and 76, respectively, to a source of energy 70 through the on/off switch 40. The rewind push button switch 30 is also connected to the source of energy 70 through on/off switch 40 and conductor 78.

The aforementioned visual indicator 42 is here depicted as a light emitting diode (LED) and is connected to the source 70 through the on/off switch 40. The LED is disposed in a series circuit between the source 70 and a terminal 46, the series circuit including the current limiting resistor 44. It may be appreciated that terminal 46 may be coupled to a reference potential to permit current to flow through the series circuit comprised of LED 42 and resistor 44 when the on/off switch 40 is closed. Alternatively, the terminal 46 may be coupled to suitable operating circuitry included in the central record/reproduce device 10.

The operation of the illustrated apparatus will now be described. Let it be assumed that an operator initially desires to transcribe the information previously dictated onto the endless loop of magnetic tape 12 provided at the central record/reproduce device 10. Accordingly, the multi-layer push button switch 28 is operated so as to admit of its first operable condition. The movable contacts 28*a*–28*e* are thus placed in engagement with those stationary contacts identified by even reference numerals, viz., contacts 282, 284, 286, 288 and 290. Thus, the movable contact 28*b* is electrically connected via stationary contact 284 and conductor 84 to the central record/reproduce device 10. Similarly, the movable contact 28*c* is electrically connected via the stationary contact 286 and conductor 86 to the central unit 10. Also, the movable contact 28*e* is electrically connected via the stationary contact 290 and the conductor 90 through the filter 92 to the central unit 10. The transcribing apparatus 23 is now conditioned to control the tape drive circuitry at the central record/reproduce device in accordance with the operation of the foot pedal device 52 and to receive the audio signals reproduced from the magnetic tape 12 by the central unit.

When the on/off switch 40 is closed, current flows from the source of energy 70 through the closed switch 40 through the LED 42 and the series connected resistor 44 to the terminal 46. The LED 42 is thus energized to provide a visual indication that power is being supplied. If an operator now activates the forward switch 52*b*, as by closing that switch in accordance with the operation of the foot pedal device 52, current flows from the source 70, through the closed switch 40, via conductor 74 through the closed forward switch 52*b*, through the movable contact 28*b* to stationary contact 284 and via conductor 84 to the central record/reproduce device 10. The tape drive circuitry provided at the central unit is thus activated to advance the magnetic tape 12 in a forward direction. As the tape is advanced past the signal reproducing head provided at the central record/reproduce device 10, pre-recorded audio signals are recovered. The recovered audio signals are then amplified and filtered and coupled to the audio signal output terminal of the central unit. These derived audio signals are additionally filtered by the filter 92 and then coupled via conductor 90 to the stationary contact 290 and the movable contact 28*e* to the signal processing electronics 60 via conductor 91. After being further processed by the signal processing electronics, the audio signals are applied to the transducer 62 whereat they are converted to audible sounds. The operator, upon detecting these audible sounds, may modify the quality thereof by suitable adjustment of the tone and volume controls 36 and 38. The reproduced audio information may then be suitably transcribed.

When the operator releases the forward switch 52*b*, current no longer flows to the central record/reproduce device 10 via conductor 84. Consequently, the movement of the magnetic tape 12 is halted. If the operator now wishes to review a portion of the tape that has previously been advanced past the signal reproducing head, the rewind switch 52*c* is activated by the appropriate operation of the foot pedal device 52. When the rewind switch 52*c* is closed, current now flows from the source 70 through the closed switch 40 via the conductor 76 through the closed switch 52*c* to the movable contact 28*c*, to the stationary contact 286 and then to the central record/reproduce device 10 via conductor 86. Current supplied to the central unit by the conductor 86 activates the tape drive circuitry of the central unit to now move the magnetic tape 12 in a reverse direction. In this manner, the magnetic tape is backed up until the rewind switch 52*c* is released. The dictated information recorded on that portion of the tape that has now been backed up may again be reviewed by suitably activating the forward switch 52*b* in the manner previously described.

Since the stationary contacts 282 and 288 are electrically isolated, it is appreciated that the inadvertent operation of the fast forward switch 52*a* or the rewind push button switch 30 when the multi-layer push button switch 22 admits of its first operable condition has no effect upon the central record/reproduce device 10. Thus, if the fast forward switch 52*a* is inadvertently activated, the electrically isolated stationary contact 282 serves as an open circuit. Consequently, current does not flow through the closed fast forward switch to further apparatus. Similarly, if the rewind push button switch 30 is inadvertently closed, the electrically isolated contact 288 serves as an open circuit such that current does not flow through the rewind push button switch to further apparatus.

Let it now be assumed that the operator desires to transcribe information that has been previously recorded on the magnetic tape housed within the cassette 26. This is achieved by operating the multi-layer push button switch 28 such that the switch admits of its second operable condition. In particular, the movable contacts 28*a*–28*e*, which are mechanically ganged for simultaneous operation, are now disposed to engage those stationary contacts identified by the odd reference numerals, viz., stationary contacts 281, 283, 285, 287 and 289. As each of these stationary contacts is electrically connected to the magnetic reproducing device 22, it is appreciated that the movable contacts 28*a*–28*e* are also electrically connected to the device 22. If the operator now activates the forward switch 52*b* by suitably operating the foot pedal device 52, a circuit is completed such that current flows from the source 70, through the closed switch 40, via the conductor 74, through closed forward switch 52*b*, through the movable contact 28*b* to the stationary contact 283 and via conductor 83 to the tape drive circuitry included in the magnetic reproducing device 22. Current flowing to the tape drive circuitry of the device 22 via conductor 83 causes the tape within the cassette 26 to be advanced past the signal reproducing head. It is appreciated that the speed at which the tape is moved past the reproducing head may be modified, as desired, by adjusting the speed control 34. Thus, the tape may be moved at a variably increased or reduced speed.

As the pre-recorded tape is advanced past the signal reproducing head, the pre-recorded signals are recovered and supplied to the appropriate amplifying and filtering circuitry provided at the magnetic reproducing device 22. The processed audio signals are then coupled from the audio signal output terminal of the device 22 via the conductor 89 to the stationary contact 289 and thence through the movable contact 28*e* via the conductor 91 to the signal processing electronics 60. The recovered audio signals are then converted to audible sounds by the transducer 62 in the manner previously described with respect to the transcribing of information previously recorded at the central record/reproduce device 10.

The release of the forward switch 52*b* serves to interrupt the circuit to the magnetic reproducing device 22 via the conductor 83 whereby the driven tape is halted. Further audible intelligence is not produced until the forward switch 52*b* is again activated.

If the operator wishes to rapidly advance the tape so as to arrive at a portion bearing pre-recorded signals to be reproduced, the fast forward switch 52*a* is activated by suitable operation of the foot pedal device 52. A circuit is now completed from the source 70 through the closed switch 40 via the conductor 72 through the closed fast forward switch 52*a* to the movable contact 28*a* through the stationary contact 281 via the conductor 81 to the tape drive circuitry provided at the magnetic reproducing device 22. The tape drive circuitry responds to the signal supplied thereto by the conductor 81 to now drive the tape within the cassette 26 in a forward direction at a relatively fast speed. The magnetic tape is rapidly advanced until the fast forward switch 52*a* is released. In this manner, the preselected portion of magnetic tape is disposed for transcription.

To review a portion of the magnetic tape that has been previously transcribed and has thus been advanced beyond the signal reproducing head, the rewind switch 52*c* is activated by suitably operating the foot pedal device 52. Accordingly, current is supplied from the source 70 through the closed switch 40 via the conductor 76 through the closed rewind switch 52*c* through the movable contact 28*c* to the stationary contact 285 and via the conductor 85 to the tape drive circuitry provided at the magnetic reproducing device 22. The tape drive circuitry responds to the supply of current thereto by the conductor 85 to move the tape in the reverse direction. The magnetic tape cassette 26 is thus rewound until the rewind switch 52*c* is released or until the entire length of tape is rewound upon the supply reel. Once the rewind switch 52*c* is released, current no longer flows from the source 70 to the tape device circuitry included in the magnetic reproducing device 22 and, therefore, the tape is halted. The rewound tape may again be reviewed by activating the forward switch 52*b*.

An alternative rewind operation may be achieved by closing the rewind push button switch 30. The operation of the switch 30 completes a circuit from the source 70 through the closed switch 40 via the conductor 78 through the closed rewind switch contacts 30*a* through the movable contact 28*d* to the stationary contact 287 and via the conductor 87 to the magnetic reproducing device 22. Thus, the application of current to the tape drive circuitry provided at the device 22 by the conductor 85 or the conductor 87 causes the tape within the cassette 26 to be driven in the reverse direction. The release of the rewind switch contacts 30*a* interrupts the supply of current to the tape drive circuitry of the magnetic reproducing device 22 to thereby halt the reverse movement of tape. The rewind push button switch 30 may comprise a spring loaded switch requiring the application of a force thereto to maintain the switch contacts 30*a* closed. Alternatively, the rewind push button switch may comprise a locking push button whereby the switch contacts 30*a* are locked closed when the push button is depressed and are then opened in response to the subsequent depressing of the push button.

Although the present invention has been described in detail with respect to transcribing apparatus that is adapted to permit the transcription of previously dictated information recorded on a magnetic tape cassette, it is appreciated that other magnetic media may be employed. For example, the magnetic reproducing device 22 may be adapted to receive other types of magnetic tape cartridges and even reel-to-reel tape media. Moreover, the foregoing has described a translating apparatus wherein the control switches are comprised of electromechanical switching devices. It is clear that other conventional switches, including solid state devices that are responsive to the manual operation thereof, may be used. In addition, although the exemplary embodiment described hereinabove has been provided with mutually distinct current translation paths established by each of the switches included in the foot pedal device 52 and the multi-layer push button switch 28, it is appreciated that, if a compatible central record/reproduce device and a compatible magnetic reproducing device are used, the individual current translation paths may be combined into a single channel. In that event, the operation of the various control switches causes a corresponding signal amplitude to be coupled to the central unit 10 and the magnetic reproducing device 22 to control the various tape drive functions thereat. For example, the operation of the rewind switch might supply the respective tape drive circuits with a signal admitting of a first amplitude. Similarly, the operation of the forward switch might supply the respective tape drive circuits with a signal admitting of a second, greater amplitude. And the operation of the fast forward switch might supply the respective tape drive circuits with a third signal admitting of a still greater amplitude. The corresponding tape drive functions will then be performed in accordance with the particular signal amplitude that is supplied. In a still further alternative embodiment, the filter 92 may be omitted, if desired, or may be interconnected between the movable contact 28*e* and the signal processing electronics 60 in any suitable manner.

While the invention has been particularly shown and described with reference to an exemplary embodiment thereof, it will be obvious to those skilled in the art that the foregoing and various other changes and modifications in form and details may be made without departing from the spirit and scope of the invention. It is therefore intended that the appended claims be interpreted as including all such changes and modifications.

What is claimed is:

1. Dual media transcribing apparatus for controlling the reproduction and transcription of information which previously had been recorded on different magnetic media, comprising:

a central record/reproduce device having an endless loop of bidirectionally movable magnetic tape upon which signals derived from at least one remote dictating station are recorded;

a magnetic reproducing device having a cassette-type structure within which is housed magnetic tape upon which signals are recorded, said magnetic tape being movable in a forward direction at first and second speeds and movable in a reverse direction;

operator actuable control switch means for selectively controlling the direction and speed of movement of magnetic tape upon the manual operation thereof;

a set of device selection switches having first and second states, said device selection switches selectively coupling said operator actuable control switch means to said central record/reproduce device and to said magnetic reproducing device for enabling said control switch means to control the movement of said endless loop of magnetic tape when said selection switches exhibit said first state and for enabling said control switch means to control the movement of said magnetic tape housed within said cassette-type structure when said selection switches exhibit said second state;

audio signal processing means coupled to said device selection switches for receiving the audio signals reproduced by said central record/reproduce device and said magnetic reproducing device in accordance with the state exhibited by said device selection switches; and transducing means coupled to said audio signal processing means for generating audible signals corresponding to the audio signals received by said audio signal processing means.

2. Dual media transcribing apparatus in accordance with claim 1 wherein said set of device selection switches comprise a set of selectively manually operated switches electrically connected to said operator actuable control switch means and to said central record/reproduce device and said magnetic reproducing device for selecting one of said devices to respond to the operation of said operator actuable control switch means.

3. Dual media transcribing apparatus in accordance with claim 2 wherein said set of switches comprises a plurality of simultaneously operable plural contact switches, each having a movable contact and a pair of stationary contacts, such that said central record/reproduce device is controlled by said operator actuable control switch means when the movable contacts engage first stationary contacts and said magnetic reproducing device is controlled by said operator actuable control switch means when the movable contacts engage second stationary contacts.

4. Dual media transcribing apparatus in accordance with claim 3 wherein said operator actuable control switch means comprises a second set of switches included in a foot operated switching device.

5. Dual media transcribing apparatus in accordance with claim 4 wherein said second set of switches comprises a fast forward switch for enabling the forward movement of magnetic tape at a relatively rapid speed when said fast forward swtich is operated; a forward switch for enabling the forward movement of magnetic tape at a relatively slower speed when said forward switch is operated; and a rewind switch for enabling the reverse movement of magnetic tape when said rewind switch is operated.

6. Dual media transcribing apparatus in accordance with claim 5 wherein said plurality of simultaneously operable plural contact switches comprises a first switch whose movable contact is connected to said fast forward switch, whose first contact is electrically isolated and whose second contact is connected to said magnetic reproducing device; a second switch whose movable contact is connected to said forward switch, whose first contact is connected to said central record/reproduce device and whose second contact is connected to said magnetic reproducing device; and a third switch whose movable contact is connected to said rewind switch, whose first contact is connected to said central record/reproduce device and whose second contact is connected to said magnetic reproducing device.

7. Dual media transcribing apparatus in accordance with claim 6 wherein said plurality of simultaneously operable plural contact switches further comprises a fourth switch for selectively coupling audio signals to said audio signal processing means, said fourth switch having its movable contact connected to said audio signal processing means, its first contact coupled to audio signal output means included in said central record/reproduce device and its second contact coupled to audio signal output means included in said magnetic reproducing device.

8. Dual media transcribing apparatus in accordance with claim 7 wherein said first, second, third and fourth switches are included in a multi-layer push button switch.

9. Dual media transcribing apparatus in accordance with claim 8 further including a rewind push button switch for enabling the reverse movement of magnetic tape when operated; and a fifth switch included in said multi-layer push button switch, said fifth switch having its movable contact connected to said rewind push button switch, its first contact electrically isolated and its second contact connected to said magnetic reproducing device.

10. Dual media transcribing apparatus in accordance with claim 9 wherein said audio signal processing means includes manually operable tone control means and manually operable volume control means for adjusting the tone and volume of the generated audible signals.

11. Dual media transcribing apparatus for use with a central record/reproduce device having an endless magnetic tape upon which signals have been recorded and with a magnetic reproducing device having a magnetic tape cassette upon which signals have been recorded; the dual media transcribing apparatus being selectively operable to control the central record/reproduce device and the magnetic reproducing device for reproducing the pre-recorded signals and comprising foot operated switch means for enabling the movement of magnetic tape in a forward direction and in a reverse direction; selectively operable push button switch means interconnecting said foot operated switch means with said central record/reproduce device and said magnetic reproducing device for selecting one of said devices to respond to the operation of said foot operated switch means; and sound generating means cooperable with said push button switch means for receiving audio signals reproduced by said central record/reproduce device and said magnetic reproducing device and selectively supplied thereto for generating sounds corresponding to said reproduced audio signals.

12. Dual media transcribing apparatus in accordance with claim 11 wherein said foot operated switch means includes a fast forward switch operable to enable the movement of magnetic tape in a forward direction at a relatively fast speed; a forward switch operable to enable the movement of magnetic tape in a forward direction at a relatively slower speed; and a rewind switch operable to enable the movement of magnetic tape in a reverse direction.

13. Dual media transcribing apparatus in accordance with claim 12 wherein said push button switch means comprises a multi-layer push button switch having a number of layers that is at least equal to the number of switches included in said foot operated switch means, said multi-layer push button switch admitting of a first operable condition to electrically connect the foot operated switch means to said central record/reproduce device and a second operable condition to electrically connect the foot operated switch means to said magnetic reproducing device.

14. Dual media transcribing apparatus in accordance with claim 13 wherein said switches included in said foot operated switch means are coupled to a source of energy to selectively supply energy to said central record/reproduce device and to said magnetic reproducing device in accordance with the selective operation of said switches and the selective operation of said multi-layer push button switch.

15. Dual media transcribing apparatus in accordance with claim 14 wherein said multi-layer push button switch includes a layer electrically connected to said sound generating means to supply audio signals reproduced by said central record/reproduce device when said multi-layer push button switch admits of said first operable condition and to supply audio signals reproduced by said magnetic reproducing device when said multi-layer push button switch admits of said second operable condition.

* * * * *